United States Patent
Wildfeuer et al.

(10) Patent No.: US 7,453,826 B2
(45) Date of Patent: Nov. 18, 2008

(54) MANAGING MULTICAST CONFERENCE CALLS

(75) Inventors: Herbert M. Wildfeuer, Santa Barbara, CA (US); Chieh-wen K. Tsai, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 10/675,369

(22) Filed: Sep. 30, 2003

(65) Prior Publication Data

US 2005/0068904 A1    Mar. 31, 2005

(51) Int. Cl.
*H04L 12/16* (2006.01)
(52) U.S. Cl. .................... 370/260; 370/535; 370/542
(58) Field of Classification Search ............. None
See application file for complete search history.

(56) References Cited

U.S. PATENT DOCUMENTS

| | | | | |
|---|---|---|---|---|
| 4,567,332 | A | 1/1986 | Jamison | 379/27.01 |
| 5,963,547 | A | 10/1999 | O'Neil et al. | 370/260 |
| 6,327,276 | B1* | 12/2001 | Robert et al. | 370/535 |
| 6,408,327 | B1 | 6/2002 | McClennon et al. | 709/204 |
| 6,466,550 | B1 | 10/2002 | Foster et al. | 370/261 |
| 6,717,921 | B1* | 4/2004 | Aggarwal et al. | 370/256 |
| 2002/0186827 | A1* | 12/2002 | Griffiths | 379/207.02 |
| 2002/0188731 | A1* | 12/2002 | Potekhin et al. | 709/227 |
| 2003/0002481 | A1* | 1/2003 | Laursen et al. | 370/352 |
| 2003/0149724 | A1* | 8/2003 | Chang | 370/260 |
| 2003/0189589 | A1* | 10/2003 | LeBlanc et al. | 345/723 |
| 2004/0052218 | A1* | 3/2004 | Knappe | 370/260 |
| 2004/0085914 | A1* | 5/2004 | Baxley et al. | 370/260 |
| 2008/0101410 | A1* | 5/2008 | Barkley et al. | 370/260 |

OTHER PUBLICATIONS

PCT, Notification of Transmittal of the International Search Report and The Written Opinion of the International Searching Authority, or the Declaration, dated Nov. 23, 2005 for International Application No. PCT/US04/27112, 12 pages.

* cited by examiner

*Primary Examiner*—Firmin Backer
*Assistant Examiner*—Phuongchau B Nguyen
(74) *Attorney, Agent, or Firm*—Baker Botts L.L.P.

(57) ABSTRACT

Managing a multicast conference call includes receiving signals at a local endpoint participating in a multicast conference call with remote endpoints. The signals include a local signal associated with the local endpoint and remote signals, where each remote signal is associated with a remote endpoint. Metric ratings are determined, where each metric rating reflects an importance of a signal. The metric ratings include a local metric rating corresponding to the local signal and remote metric ratings, where each remote metric rating corresponds to a remote signal. The local metric rating and the remote metric ratings are compared, and a subset of signals is selected according to the comparison.

17 Claims, 2 Drawing Sheets

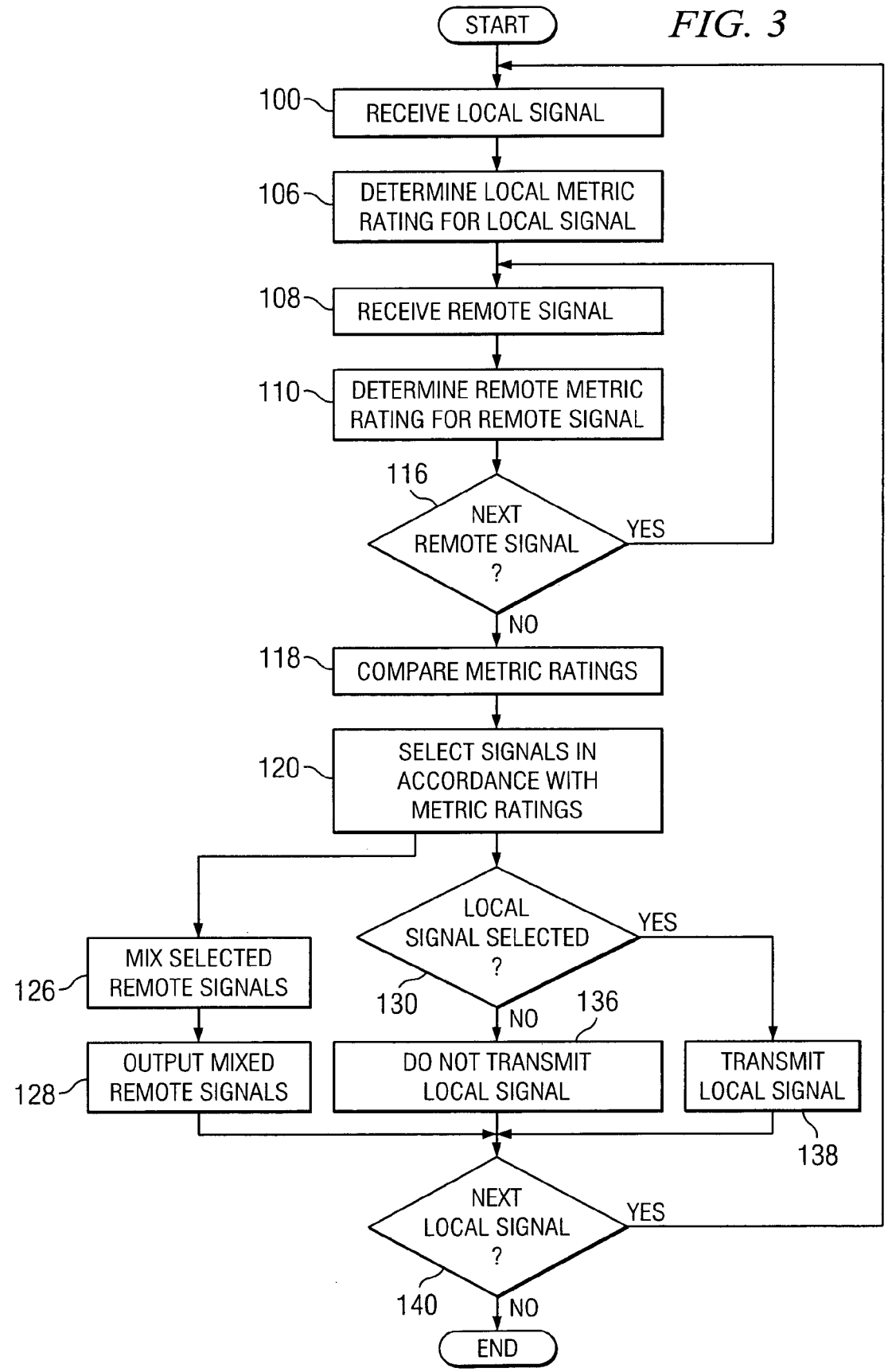

MANAGING MULTICAST CONFERENCE CALLS

TECHNICAL FIELD OF THE INVENTION

This invention relates generally to the field of telecommunications and more specifically to managing multicast conference calls.

BACKGROUND OF THE INVENTION

A conference call allows more than two endpoints to participate in a call. According to a known multicast conference technique, a multicast session is established between the endpoints of a conference call. Every endpoint may transmit a signal into the multicast session, and the other endpoints may play the transmitted signals. For example, an endpoint may transmit a signal if it comprises voice signal, and may play the first received signals. Uncontrolled multicast conferencing, however, tends to use more network bandwidth than compared to the traditional conference bridge approach. Consequently, known multicast conferencing techniques may be unsatisfactory in certain situations.

SUMMARY OF THE INVENTION

In accordance with the present invention, disadvantages and problems associated with previous techniques for managing multicast conference calls may be reduced or eliminated.

According to one embodiment of the present invention, managing a multicast conference call includes receiving signals at a local endpoint participating in a multicast conference call with remote endpoints. The signals include a local signal associated with the local endpoint and remote signals, where each remote signal is associated with a remote endpoint. Metric ratings are determined, where each metric rating reflects an importance of a signal. The metric ratings include a local metric rating corresponding to the local signal and remote metric ratings, where each remote metric rating corresponds to a remote signal. The local metric rating and the remote metric ratings are compared, and a subset of signals is selected according to the comparison.

Certain embodiments of the invention may provide one or more technical advantages. A technical advantage of one embodiment may be that signals of higher importance are selected over signals of lower importance. Signal importance may reflect signal quality such that the selected signals may have higher quality. Another technical advantage of one embodiment may be that a signal is transmitted into the multicast session only if it is one of the selected signals. Accordingly, network bandwidth utilization may be optimized. Yet another technical advantage of one embodiment may be that only selected signals are played at the endpoint. Accordingly, the played signals may have a higher signal quality.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart demonstrating one embodiment of a method for managing multicast conference calls.

DETAILED DESCRIPTION OF THE DRAWINGS

Figure 1:
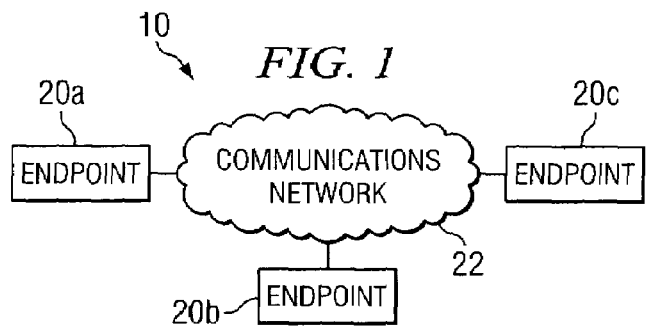
FIG. 1 is a block diagram of one embodiment of a system that includes an endpoint for managing multicast conference calls.
Figure 2:
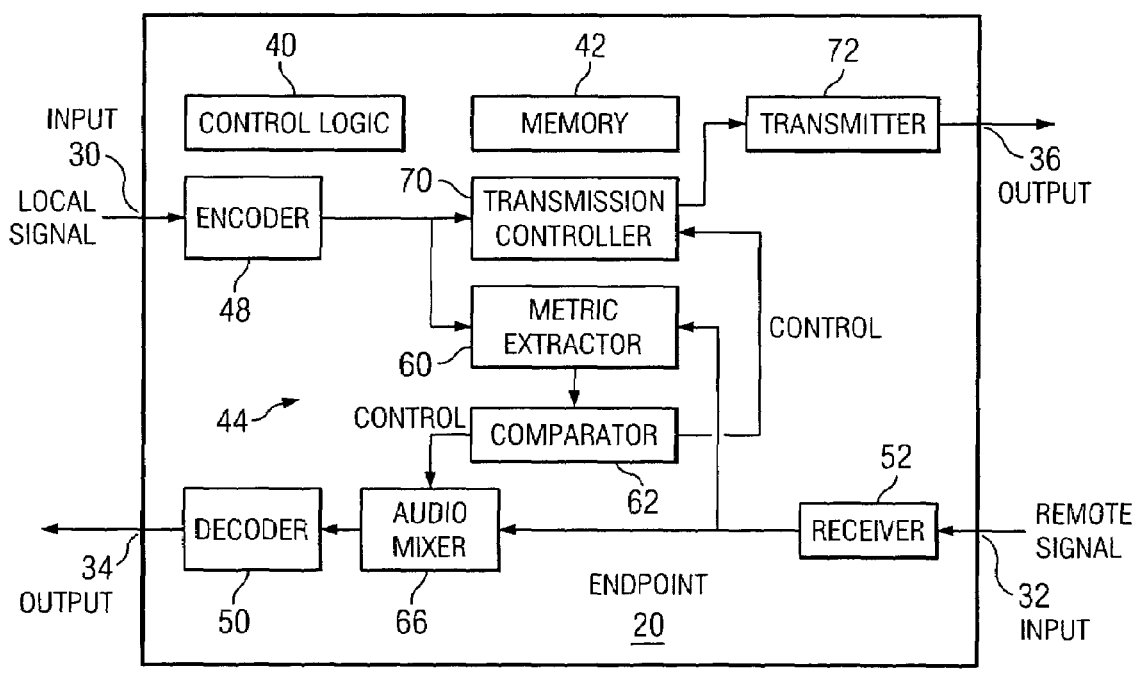
FIG. 2 is a block diagram of one embodiment of an endpoint for managing multicast conference calls.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 that includes one or more endpoints 20 for managing multicast conference calls. According to one embodiment, endpoints 20 participate in a multicast conference call for which a multicast session has been established. Each endpoint 20 may transmit a signal into the multicast session so that other endpoints 20 may play the transmitted signals.

According to the embodiment, a local endpoint 20 may manage a multicast conference call by establishing a metric rating for a local signal processed at endpoint 20 and for each remote signal received from remote endpoints 20. The metric rating may reflect the importance of a signal to the conference call. Local endpoint 20 selects signals based on their metric ratings and mixes the selected remote signals to play at local endpoint 20. Local endpoint 20 transmits the local signal to other endpoints 20 only if the local signal is a selected signal.

According to the illustrated embodiment, system 10 includes endpoints 20 coupled to a communications network 22 as illustrated in FIG. 1. Endpoints 20 may participate in a multicast conference call, where M represents the total number of endpoints 20 in the conference call. A multicast conference call may refer to a conference call for which a multicast session, for example, a multicast voice over IP (VoIP) session is established to allow endpoints 20 to communicate signals to each other. Certain embodiments of multicast conferencing may have certain advantages over the traditional conference bridge approach. For example, multicast based conferencing may provide lower latency. In addition, the need for transcoding may be eliminated in multicast conferencing. Moreover, multicast conferencing typically does not require encoding of mixed speech signals.

During a call, endpoints 20 may communicate signals, such as signals comprising packets. A packet may comprise a bundle of data organized in a specific way for transmission. A packet may carry any suitable information such as voice, data, multimedia, other information, or any combination of the preceding. Packets may be communicated according to Real-time Transport Protocol (RTP), Real Time Control Protocol (RTCP), or other suitable protocol. According to one embodiment, RTP may provide for sufficient transport speed.

Endpoint 20 may comprise any device suitable to participate in and to manage a multicast conference call. Endpoint 20 may comprise, for example, a personal digital assistant, a telephone, a mobile handset, a router, a gateway, or any other device suitable for communicating signals to and from communication network 22. Endpoint 20 may support, for example, simple Internet Protocol (IP), mobile IP, voice over IP (VOIP) or any other suitable communication protocol.

Communication network 22 allows endpoints 20 to communicate with each other. Communication network 22 may comprise a public switched telephone network (PSTN), a public or private data network, the Internet, a wireline or wireless network, a local, regional, or global communication network, an enterprise intranet, other suitable communication link, or any combination of the preceding.

Modifications, additions, or omissions may be made to system 10 without departing from the scope of the invention. For example, system 10 may have more, fewer, or other endpoints 20. Moreover, the operations of system 10 may be performed by more, fewer, or other modules. For example, the operations of endpoint 20 may be performed by more than one endpoint 20. Additionally, functions may be performed using any suitable logic comprising software, hardware, other logic, or any suitable combination of the preceding. As used in this document, "each" refers to each member of a set or each member of a subset of a set.

FIG. 2 is a block diagram of one embodiment of an endpoint 20 for managing multicast conference calls. According to one embodiment, a local endpoint 20 may manage a multicast conference call by establishing a metric rating for a local signal processed at endpoint 20 and for each remote signal received from remote endpoints 20. The metric rating may reflect the importance of a signal to the conference call. Local endpoint 20 selects signals based on their metric ratings and mixes the selected remote signals to play at local endpoint 20. Local endpoint 20 transmits the local signal only if the local signal is a selected signal.

According to the illustrated embodiment, endpoint 20 includes inputs 30 and 32, outputs 34 and 36, control logic 40, a memory 42, and one or more modules 44 coupled as shown in FIG. 2. Input 30 receives a local signal, and input 32 receives a remote signal. A local signal comprises a signal that is processed and transmitted by endpoint 20. For example, a local signal may comprise a voice signal from a user of endpoint 20. A remote signal comprises a signal received by endpoint 20 from other endpoints 20. For example, remote signals may comprise voice signals from the users of the other endpoints 20. Output 34 outputs a signal at endpoint 20. For example, output 34 may output a mixed signal formed from the voice signals of the endpoints 20. Output 36 transmits a signal to other endpoints 20. For example, output 36 may transmit the voice signal of the user.

Control logic 40 manages the operation of modules 44 of endpoint 20. As used in this document, the term "control logic" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Memory 42 stores data used by endpoint 20, and may include Random Access Memory (RAM), Read Only Memory (ROM), magnetic drives, disk drives, Compact Disk (CD) drives, Digital Video Disk (DVD) drives, removable media storage, any other suitable data storage device, or any combination of any of the preceding.

According to one embodiment, modules 44 may include, for example, an encoder 48, a decoder 50, a receiver 52, a metric extractor 60, a comparator 62, an audio mixer 66, a transmission controller 70, and a transmitter 72 coupled as shown in FIG. 2. Endpoint 20 receives remote signals through input 32 and local signals through input 30. Receiver 52 receives the remote signals through input 32. Encoder 48 converts local signals from an analog form to a digital form.

Metric extractor 60 extracts metrics from signals and determines metric ratings from the extracted metrics. For example, metric extractor 60 extracts local metrics from local signals and extracts remote metrics from remote signals. A metric may comprise a feature of a signal that reflects the signal's importance to a conference call by, for example, indicating the signal's quality. Examples of metrics may include, for example, signal power, peak-to-mean ratio, or other measure of a signal. As another example, a metric may comprise a spectral analysis that indicates whether a signal is a voice signal or not a voice signal. Metric extractor 60 may organize the metrics for a signal in any suitable manner. For example, a metric vector $v(x_1, \ldots, x_p)$ that includes metric values $x_i$ for the metrics may be generated for a signal.

According to one embodiment, metric extractor 60 may relatively quickly calculate a metric for a signal and then delay the metric for a certain time period in order to reduce the variation of the metric over time. For example, metrics may be delayed for a period of approximately 200 to 250 milliseconds such as 240 milliseconds.

Metric extractor 60 may extract the metrics of a signal in any suitable manner. For example, metric extractor 60 may measure the metrics of a signal such as the local signal in order to determine the metric values for the signal. According to one embodiment, a signal such as a remote signal may include an appended metric that was calculated by, for example, the endpoint 20 that sent the remote signal. The metric may, for example, be appended to the Realtime Transport Protocol (RTP) packet of the signal. Utilizing an appended metric may, in certain situations, optimize resource utilization by reducing or eliminating the need to recalculate metrics at each endpoint 20. Appending the metric may, in certain situations, reduce the difficulty associated with computing metrics from distorted signals. According to another embodiment, remote signal may not have an appended metric, and metric extractor 60 may measure the remote signal to determine the metric for the signal.

Metric extractor 60 may determine a metric rating for each signal from the metrics. A metric rating may comprise a value calculated from one or more metrics, and may be used to select a signal. According to one embodiment, the metric rating may reflect the signal's importance to a conference call, which may indicate the signal's quality. For example, a higher ranked metric rating may indicate a more important signal, or alternatively a lower ranked metric rating may indicate a more important signal. According to one embodiment, a metric rating y may be determined by applying a function f to the values $x_1, \ldots, x_p$ of the metric vector $v(x_1, \ldots, x_p)$ according to $f(x_1, \ldots, x_p) = y$. Function f may be used to define the importance of a signal to a call. For example, function f may be used to weight the metrics in accordance to their effect on measuring importance. A metric rating may, however, be determined in any suitable manner.

Comparator 62 compares the metric ratings of the signals in order to select a subset of the signals. According to one example, N represents the maximum number of signals that may be selected, where N is less than or equal to the total number M of endpoints 20 participating in the call. As an example, N may be equal to 3. Comparator 62 may select the N signals according to their importance as indicated by their metric ratings. For example, comparator 62 may select the N highest ranked signals as the most important signals of the total of M signals. Comparator 62 notifies audio mixer 66 and transmission controller 70 of the selected signals.

Audio mixer 66 mixes the remote signals indicated by comparator 62 as selected signals. The signals may be mixed in any suitable manner. According to one embodiment, audio mixer 66 may weight the signals according to their metric ratings. Decoder 50 converts remote signals from a digital format to an analog format. Output 34 such as a speaker outputs the mixed signals from audio mixer 66. The mixed signals may, however, be output through any other suitable device. Moreover, audio mixer 66, the speaker, or both may be located at endpoint 20 or remote from endpoint 20.

Transmission controller 70 determines whether the local signal is a selected signal, for example, whether the local signal is of sufficient importance. If the local signal is a selected signal, transmission controller 70 instructs transmitter 72 to transmit the local signal through output 36. If the local signal is not a selected signal, transmission controller 70 instructs transmitter 72 to not send the local signal.

Control logic 40, memory 42, and one or more modules 44 may be integrated or separated according to particular needs. For example, the present invention contemplates the functions of control logic 40, memory 42, and one or more modules 44 being provided at a single device, for example, a communications device such as a telephone. Control logic 40, memory 42, and one or more modules 44 may, however, be separated. For example, control logic 40 and memory 42 may be located at a gateway, whereas audio mixer 66 and the speaker may be located at a communications device. Any of control logic 40, memory 42, and one or more may be coupled to each other using a bus, a local area network (LAN), a metropolitan area network (MAN), a wide area network (WAN), a global computer network such as the Internet, or any other appropriate wire line, wireless, or other links.

Modifications, additions, or omissions may be made to endpoint 20 without departing from the scope of the invention. For example, the endpoint 20 may have more, fewer, or other modules. As another example, endpoint 20 may include a module that detects whether a remote endpoint 20 is transmitting when it should not be transmitting. Moreover, the operations of endpoint 20 may be performed by more, fewer, or other modules. For example, the operations of metric extractor 60 and comparator 62 may be performed by one module, or the operations of metric extractor 60 may be performed by more than one module. Additionally, functions may be performed using any suitable logic comprising software, hardware, other logic, or any suitable combination of the preceding.

Certain embodiments of endpoint 20 may provide advantages over known techniques for transmitting a local signal. According to one known technique, local signals from all endpoints 20 are transmitted into the multicast session. According to another known technique, an endpoint 20 transmits a local signal if the local signal comprises a voice signal, but may avoid transmitting the local signal if it is receiving a maximum number of signals. Endpoint 20 may provide an advantage over these known techniques by transmitting the local signal only if the signal is sufficiently important to the conference call.

Endpoint 20 may also provide advantages over known techniques for mixing received signals. According to a known technique, all received signals are mixed at endpoint 20. According to another known technique, the starting time of a received signal is used to control which signals are mixed at endpoint 20. Endpoint 20 may provide an advantage over these known techniques by mixing only signals selected for importance.

FIG. 3 is a flowchart demonstrating one embodiment of a method for managing multicast conference calls. According to the embodiment, a local endpoint 20 participates in a conference call with remote endpoints 20. The method begins at step 100, where local endpoint 20 receives a local signal. The local signal may comprise, for example, a voice signal received from a user of endpoint 20. Metric extractor 60 determines a local metric rating for the local signal at step 106. The local metric rating may reflect the importance of the local signal to the conference call. A metric rating for a signal may be determined by generating a metric vector for the signal and applying a function to the metric vector to determine the metric rating.

Endpoint 20 receives a remote signal at step 108. The remote signal may comprise a signal received from another endpoint 20. Metric extractor 60 determines a remote metric rating for the remote signal at step 110. According to one embodiment, metric extractor 60 may analyze remote signal in order to determine the remote metric rating for the remote signal. According to another embodiment, metric extractor 60 may determine the remote metric rating from a metric appended to the remote signal.

If there is a next remote signal at step 116, the method returns to step 108, where endpoint 20 receives the next remote signal. If there is no next remote signal at step 116, the method proceeds to step 118. Comparator 62 compares the metric ratings at step 118. Signals are selected according to the metric ratings at step 120. For example, the more important signals may be selected. Audio mixer 66 mixes the selected signals at step 126. Output 34 outputs the mixed signals at step 128. After outputting the mixed signals, the method proceeds to step 140.

Transmission controller 70 determines whether the local signal is a selected signal at step 130. If the local signal is not a selected signal, the method proceeds to step 136, where transmission controller 70 instructs transmitter 72 to not transmit the local signal. After not transmitting the local signal, the method proceeds to step 140. If the local signal is a selected signal, the method proceeds to step 138, where transmission controller 70 instructs transmitter 72 to transmit the local signal. After transmitting the local signal, the method proceeds to step 140.

If there is a next local signal at step 140, the method returns to step 100 to receive the next local signal. If there is no next signal at step 140, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that signals of higher importance are selected over signals of lower importance. Signal importance may reflect signal quality such that the selected signals may have higher quality. Another technical advantage of one embodiment may be that a signal is transmitted only if it is one of the selected signals. Accordingly, network bandwidth utilization may be optimized. Yet another technical advantage of one embodiment may be that only selected signals are played at the endpoint. Accordingly, the played signals may have a higher signal quality.

Although an embodiment of the invention and its advantages are described in detail, a person skilled in the art could make various alterations, additions, and omissions without departing from the spirit and scope of the present invention as defined by the appended claims.

What is claimed is:

1. A method for managing a multicast conference call, comprising:

receiving a plurality of signals at a local endpoint participating in a multicast conference call among the local endpoint and one or more remote endpoints, the plurality of signals comprising a local signal and one or more remote signals, the local signal associated with the local endpoint, each remote signal associated with a remote endpoint of the one or more remote endpoints;

determining, at the local endpoint, a plurality of metric ratings by:
  generating a metric vector for each signal of the plurality of signals, each metric vector comprising a plurality of metric values generated for the each signal, the plurality of metric values comprising a first metric value and a second metric value; and
  applying a function to each metric vector to generate a metric rating for each signal, the function weighting the first metric value more than the second metric value because the first metric value has a greater effect on signal importance than the second metric, each metric rating reflecting an importance of a signal of the plurality of signals, the plurality of metric ratings comprising a local metric rating and one or more remote metric ratings, the local metric rating corresponding to the local signal, each remote metric rating corresponding to a remote signal of the one or more remote signals;
comparing the local metric rating and the one or more remote metric ratings; and
selecting a subset of the plurality of signals according to the comparison in order to manage the multicast conference call.

2. The method of claim 1, further comprising:
mixing the remote signals of the subset of the plurality of signals; and
outputting the mixed remote signals of the subset of the plurality of signals.

3. The method of claim 1, further comprising:
determining if the subset of the plurality of signals comprises the local signal; and
transmitting the local signal if the subset of the plurality of signals comprises the local signal.

4. The method of claim 1, wherein selecting the subset of the plurality of signals according to the comparison comprises:
identifying a predetermined number of highest ranked metric ratings; and
selecting the signals corresponding to the highest ranked metric ratings.

5. The method of claim 1, wherein determining the plurality of metric ratings comprises:
establishing the metric values for a signal of the plurality of signals according to a metric appended to the signal; and
determining a metric rating for the signal in accordance with the metric values.

6. A system for managing a multicast conference call, comprising:
one or more inputs configured to receive a plurality of signals at a local endpoint participating in a multicast conference call among the local endpoint and one or more remote endpoints, the plurality of signals comprising a local signal and one or more remote signals, the local signal associated with the local endpoint, each remote signal associated with a remote endpoint of the one or more remote endpoints;
the local endpoint including a metric extractor coupled to the one or more inputs, the metric extractor configured to determine a plurality of metric ratings by:
  generating a metric vector for each signal of the plurality of signals, each metric vector comprising a plurality of metric values generated for the each signal, the plurality of metric values comprising a first metric value and a second metric value; and
  applying a function to each metric vector to generate a metric rating for each signal, the function weighting the first metric value more than the second metric value because the first metric value has a greater effect on signal importance than the second metric, each metric rating reflecting an importance of a signal of the plurality of signals, the plurality of metric ratings comprising a local metric rating and one or more remote metric ratings, the local metric rating corresponding to the local signal, each remote metric rating corresponding to a remote signal of the one or more remote signals; and
a comparator coupled to the metric extractor and configured to:
  compare the local metric rating and the one or more remote metric ratings; and
  select a subset of the plurality of signals according to the comparison in order to manage the multicast conference call.

7. The system of claim 6, further comprising an audio mixer configured to:
mix the remote signals of the subset of the plurality of signals; and
output the mixed remote signals of the subset of the plurality of signals.

8. The system of claim 6, further comprising a transmission controller configured to:
determine if the subset of the plurality of signals comprises the local signal; and
transmit the local signal if the subset of the plurality of signals comprises the local signal.

9. The system of claim 6, wherein the comparator is configured to select the subset of the plurality of signals according to the comparison by:
identifying a predetermined number of highest ranked metric ratings; and
selecting the signals corresponding to the highest ranked metric ratings.

10. The system of claim 6, wherein the metric extractor is configured to determine the plurality of metric ratings by:
establishing the metric values for a signal of the plurality of signals according to a metric appended to the signal; and
determining a metric rating for the signal in accordance with the metric values.

11. A computer-readable medium encoded with logic for managing a multicast conference call, the logic configured to:
receive a plurality of signals at a local endpoint participating in a multicast conference call among the local endpoint and one or more remote endpoints, the plurality of signals comprising a local signal and one or more remote signals, the local signal associated with the local endpoint, each remote signal associated with a remote endpoint of the one or more remote endpoints;
determine, at the local endpoint, a plurality of metric ratings by:
  generating a metric vector for each signal of the plurality of signals, each metric vector comprising a plurality of metric values generated for the each signal, the plurality of metric values comprising a first metric value and a second metric value; and
  applying a function to each metric vector to generate a metric rating for each signal, the function weighting the first metric value more than the second metric value because the first metric value has a greater effect on signal importance than the second metric, each metric rating reflecting an importance of a signal of the plurality of signals, the plurality of metric ratings comprising a local metric rating and one or more remote metric ratings, the local metric rating corresponding to the local signal, each remote metric rating corresponding to a remote signal of the one or more remote signals;
compare the local metric rating and the one or more remote metric ratings; and
select a subset of the plurality of signals according to the comparison in order to manage the multicast conference call.

12. The logic of claim 11, further configured to:
mix the remote signals of the subset of the plurality of signals; and
output the mixed remote signals of the subset of the plurality of signals.

13. The logic of claim 11, further configured to:
determine if the subset of the plurality of signals comprises the local signal; and
transmit the local signal if the subset of the plurality of signals comprises the local signal.

14. The logic of claim 11, configured to select the subset of the plurality of signals according to the comparison by:
identifying a predetermined number of highest ranked metric ratings; and
selecting the signals corresponding to the highest ranked metric ratings.

15. The logic of claim 11, configured to determine the plurality of metric ratings by:
establishing the metric values for a signal of the plurality of signals according to a metric appended to the signal; and
determining a metric rating for the signal in accordance with the metric values.

16. A system for managing a multicast conference call, comprising:
means for receiving a plurality of signals at a local endpoint participating in a multicast conference call among the local endpoint and one or more remote endpoints, the plurality of signals comprising a local signal and one or more remote signals, the local signal associated with the local endpoint, each remote signal associated with a remote endpoint of the one or more remote endpoints;
means for determining, at the local endpoint, a plurality of metric ratings by:
generating a metric vector for each signal of the plurality of signals, each metric vector comprising a plurality of metric values generated for the each signal, the plurality of metric values comprising a first metric value and a second metric value; and
applying a function to each metric vector to generate a metric rating for each signal, the function weighting the first metric value more than the second metric value because the first metric value has a greater effect on signal importance than the second metric, each metric rating reflecting an importance of a signal of the plurality of signals, the plurality of metric ratings comprising a local metric rating and one or more remote metric ratings, the local metric rating corresponding to the local signal, each remote metric rating corresponding to a remote signal of the one or more remote signals;
means for comparing the local metric rating and the one or more remote metric ratings; and
means for selecting a subset of the plurality of signals according to the comparison in order to manage the multicast conference call.

17. A method for managing a multicast conference call, comprising:
receiving a plurality of signals at a local endpoint participating in a multicast conference call among the local endpoint and one or more remote endpoints, the plurality of signals comprising a local signal and one or more remote signals, the local signal associated with the local endpoint, each remote signal associated with a remote endpoint of the one or more remote endpoints;
determining a plurality of metric ratings, each metric rating reflecting an importance of a signal of the plurality of signals, the plurality of metric ratings comprising a local metric rating and one or more remote metric ratings, the local metric rating corresponding to the local signal, each remote metric rating corresponding to a remote signal of the one or more remote signals, the plurality of metric ratings determined by:
establishing the metric values for a signal of the plurality of signals according to a metric appended to the signal;
determining a metric rating for the signal in accordance with the metric values;
generating a metric vector for each signal of the plurality of signals; and
determining a metric rating for each signal of the plurality of signals in accordance with the metric vector for the signal by applying a function to each metric vector;
comparing the local metric rating and the one or more remote metric ratings;
selecting a subset of the plurality of signals according to the comparison in order to manage the multicast conference call by:
identifying a predetermined number of highest ranked metric ratings; and
selecting the signals corresponding to the highest ranked metric ratings;
mixing the remote signals of the subset of the plurality of signals;
outputting the mixed remote signals of the subset of the plurality of signals;
determining if the subset of the plurality of signals comprises the local signal; and
transmitting the local signal if the subset of the plurality of signals comprises the local signal.

* * * * *